United States Patent
Prior et al.

(10) Patent No.: US 7,812,592 B2
(45) Date of Patent: Oct. 12, 2010

(54) METHOD OF MONITORING A PHOTOVOLTAIC GENERATOR

(75) Inventors: Oliver Prior, Marsberg (DE); Ralf Juchem, Niestetal (DE); Matthias Victor, Niestetal (DE); Oliver Frank, Hannover (DE); Juergen Schlabbach, Bielefeld (DE)

(73) Assignee: SMA Solar Technology AG, Niestetal (DE)

( * ) Notice: Subject to any disclaimer, the term of this patent is extended or adjusted under 35 U.S.C. 154(b) by 237 days.

(21) Appl. No.: 11/978,334

(22) Filed: Oct. 29, 2007

(65) Prior Publication Data
US 2008/0106250 A1 May 8, 2008

(30) Foreign Application Priority Data
Nov. 3, 2006 (DE) ............ 10 2006 052 295

(51) Int. Cl.
*G01R 23/02* (2006.01)
*H01L 31/042* (2006.01)
*G08B 13/14* (2006.01)

(52) U.S. Cl. ............ 324/76.39; 136/244; 136/290; 340/568.1

(58) Field of Classification Search ............ 324/76.19, 324/76.39; 340/568.1–568.4
See application file for complete search history.

(56) References Cited

U.S. PATENT DOCUMENTS

| | | | | |
|---|---|---|---|---|
| 4,695,788 A | * | 9/1987 | Marshall | 324/527 |
| 5,243,328 A | * | 9/1993 | Lee et al. | 340/568.3 |
| 7,042,228 B2 | * | 5/2006 | Lally et al. | 324/527 |
| 2004/0194532 A1 | * | 10/2004 | Lally et al. | 324/527 |
| 2007/0257681 A1 | * | 11/2007 | Christophersen et al. | 324/426 |

FOREIGN PATENT DOCUMENTS

| | | |
|---|---|---|
| DE | 35 09 201 | 9/1986 |
| DE | 94 11 783 U | 3/1995 |
| DE | 101 61 480 B4 | 5/2004 |
| EP | 0 716 311 | 6/1996 |
| WO | WO 95/25374 | 9/1995 |
| WO | 00 63709 A | 10/2000 |
| WO | WO 02/10782 | 2/2002 |

OTHER PUBLICATIONS

Islam S., Detecting of Shorted turns and Winding Movements . . . Using Frequency Response Analysis, IEEE Power Engineering Society Winter Meeting. Conference Proceedings, IEEE, Jan. 23-27, 2000, pp. 2233-2238, vol. 3.

* cited by examiner

Primary Examiner—Timothy J Dole
(74) Attorney, Agent, or Firm—Thomas R. Vigil

(57) ABSTRACT

The subject matter of the present invention is a method for monitoring a photovoltaic generator (1) for generating current with a number of solar cells connected between two external connections by repeated feeding of a current with a frequency spectrum into the generator current circuit, detecting thereby a respective frequency response in the frequency spectrum with the supplied current as the input variable and an electric variable of the generator as the output variable, and detecting a change in the frequency response for monitoring the photovoltaic generator (1) in the event of a change during repeated feeding.

15 Claims, 5 Drawing Sheets

METHOD OF MONITORING A PHOTOVOLTAIC GENERATOR

CROSS-REFERENCE TO RELATED APPLICATIONS

This application claims Priority from German Application No. DE 10 2006 052 295.8-34 filed on 3 Nov. 2006

1. Field of the Invention

The invention relates to a method of monitoring a photovoltaic generator for generating current with a number of solar cells connected between two external connections.

For photovoltaic generator theft monitoring it is known to infer theft from abrupt current changes of the generator. The disadvantage thereof is that this method can only be used during the day since the generator does not supply current by night.

2. Description of the Prior Art

A method of protecting a solar module against unauthorized manipulation or theft is known from DE 101 61 480 B4. This method relies on detecting an interruption in a series connection. An alternative current is thereby supplied. The measuring current supply may also be clocked. By feeding the measuring current at intervals, there is no need for permanent current flow. These currents differ from the direct current of the generator. This method may also be utilized during the night.

Another method deals with detecting electric arcs in solar generators (WO 95/25374). It is the outgoing electromagnetic radiation that is detected here. Electric arcs occur in the event of a short or of an interruption in the current path. The circuits needed to detect electric arcs are complex and expensive though.

BRIEF SUMMARY OF THE INVENTION

It is the object of the invention to find a low cost monitoring method, more specifically for theft monitoring, which is operative during the night hours.

This object is achieved, in accordance with the invention, in a method for monitoring a photovoltaic generator for generating current with a number of solar cells connected between two external connections by repeatedly feeding into the generator current circuit a current with a frequency spectrum, detecting thereby a respective frequency response in the frequency spectrum with the supplied current as the input variable and an electric variable of the generator as the output variable, and detecting a change in the frequency response for monitoring the photovoltaic generator in the event of a change during repeated supply.

The invention relies on the observation that a change in the frequency response is reliably indicative of a theft or more generally of a manipulation at the solar generator. Accordingly, only certain current amplitudes of a frequency will change when a solar module is being removed, with other current amplitudes remaining unaffected. If one module is missing, capacitances and inductances or impedances change and, as a result thereof, the frequency response of the generator. If a current with a frequency spectrum is fed, the frequency response is typical if a generator change is made.

The frequency response, i.e., the dependency on the supplied frequency of an electric variable such as impedance, capacitance, inductance, current or voltage, may be detected.

Electric arcs may also be detected. In the event of an electric arc, there is a change in the frequency response. Electric arcs may be caused by defective contact points and may cause fire. Therefore, the monitoring method also serves for fire prevention.

An advantage of the method is that theft monitoring, or protection against manipulation, is also possible in the night hours, i.e., also when the solar generator does not deliver any current.

The invention is capable of using one single measuring principle for monitoring various damages or manipulations on the generator, including theft of the generator. This offers cost advantages. Moreover, the method of the invention is very reliable since there is no need for complex detection of electromagnetic radiation.

Theft monitoring with the method of the invention preferably occurs during the night hours only, a second method being utilized during the day hours. The second method uses more specifically a reference sensor, preferably a reference solar generator. This measure provides optimal theft security. During the day, an abrupt current interruption for example is indicative of a theft. A current change occurs relatively slowly, for example when a cloud covers the generator. During the night hours, by contrast, the first method with the frequency response monitoring is utilized as it is very reliable in operation when the solar generator does not generate any current.

As an alternative, or in addition thereto, the method may also be utilized for electric arc monitoring or for checking defective contacts of the photovoltaic generator. In this way, fires caused by a defective electric contact may be prevented. Instead or in addition to an alarm signal, the solar generator may be switched off when an electric arc occurs.

A quite simple but still effective developed implementation of the invention is characterized in that an auxiliary variable is formed from measured current or voltage curves and that the change of the auxiliary variable is monitored, an alarm signal occurring when the change of the auxiliary variable exceeds a threshold value. A monitoring circuit may be provided in a quite simple way. It is advantageous if the auxiliary variable is formed from the sum of the measured current or voltage amplitudes or if the auxiliary variable occurs as a result of the integration of the surfaces beneath the measured curves. Both solutions are easy to realize with computer or microprocessor control.

It is particularly advantageous if the current having a frequency spectrum is fed using a first converter with primary and secondary winding that is connected to the direct current circuit of the generator and if the frequency spectrum is detected using a second converter with primary and secondary winding that is mounted in series with the first converter. As a result, a monitoring circuit may be connected in series to the generator and must be connected to an external connection only. Accordingly, the output of the solar generator virtually constitutes the output of the monitoring circuit. The losses generated by the monitoring circuit are negligible since the direct current drop generated in the converter substantially tends to zero.

It is optimal if sinusoidal frequencies are fed into the direct current circuit of the generator. A signal change results in several alternating voltages so that a frequency range may be spanned. A frequency change may be generated continuously with the help of a function generator or abruptly.

A change of an electric variable which may be measured by the frequency spectrum is located with advantage. The impedance change of the generator may be directly measured. This is possible because, when modules are suddenly missing, the line impedances change and existing capacitances are suddenly different. The conduction paths in the generator are quite long so that the existing impedances are quite large and readily measurable. In principle, only one capacitance or one inductance can be measured. The advantage is that detection is also possible if the modules are connected in parallel. Whilst a measurement relying on a line interruption is only possible if the solar modules are connected in series, the invention can be utilized both for series and/or parallel connection of solar modules.

Further advantageous implementations of the invention will become apparent from the subordinate claims.

The invention will be explained in closer detail herein after with reference to the drawings.

DETAILED DESCRIPTION OF THE INVENTION

Figure 1:
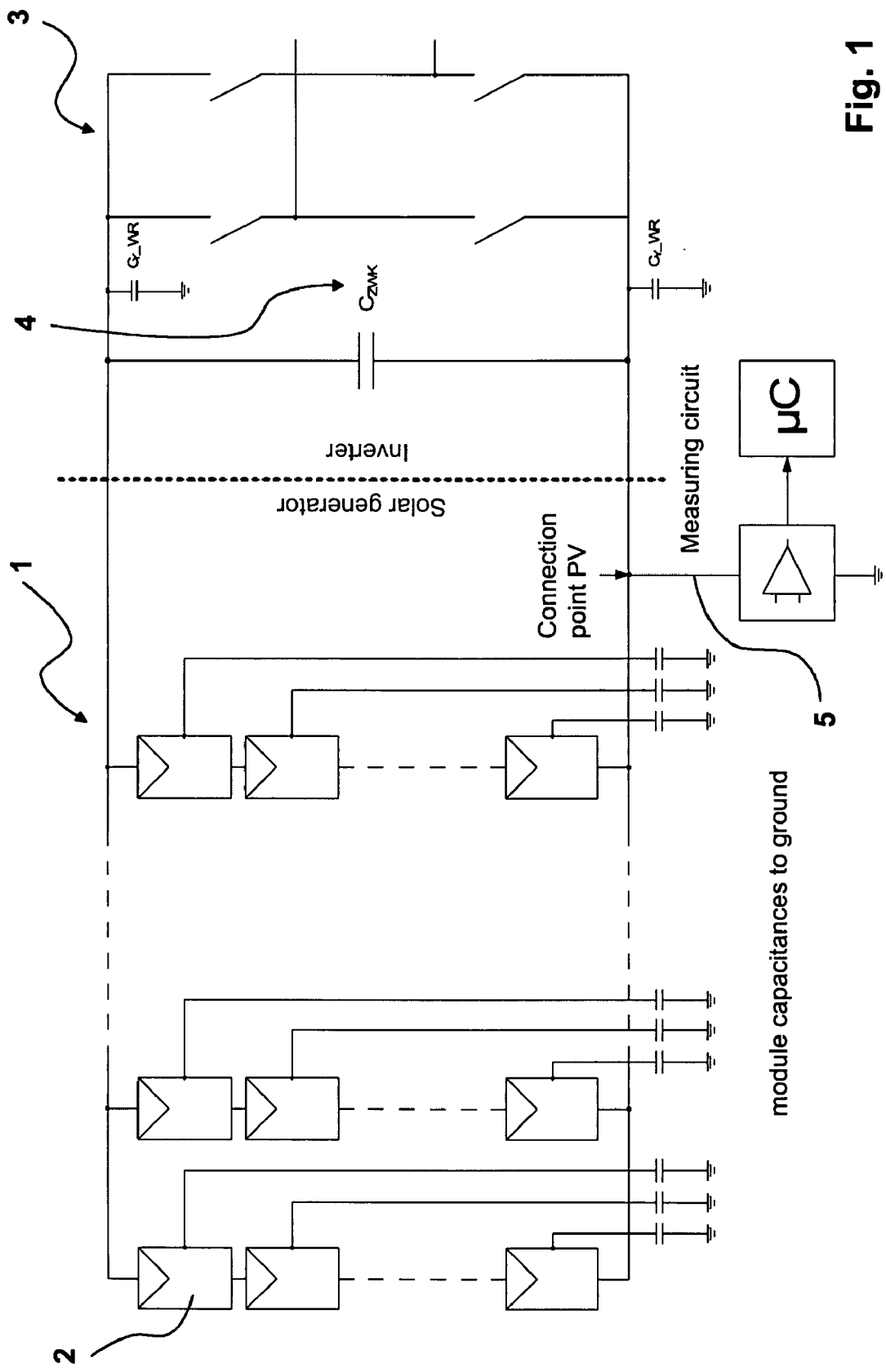
FIG. 1 shows an illustration of a photovoltaic plant with several solar modules connected in series and/or in parallel.

FIG. 1 shows a photovoltaic plant with a photovoltaic generator 1 with several photovoltaic modules 2 connected in series and in parallel. Between an inverter 3 with input capacitor 4, there is disposed a monitoring circuit 5. Said monitoring circuit is mounted in series with the photovoltaic generator 1 and the inverter in the DC circuit.

Figure 2:
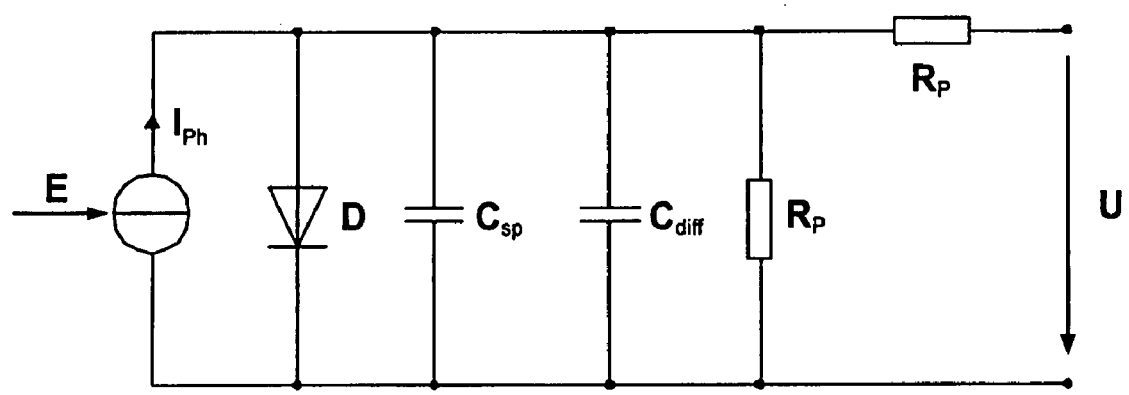
FIG. 2 shows an equivalent circuit diagram of a solar cell of a plant.
Figure 3:
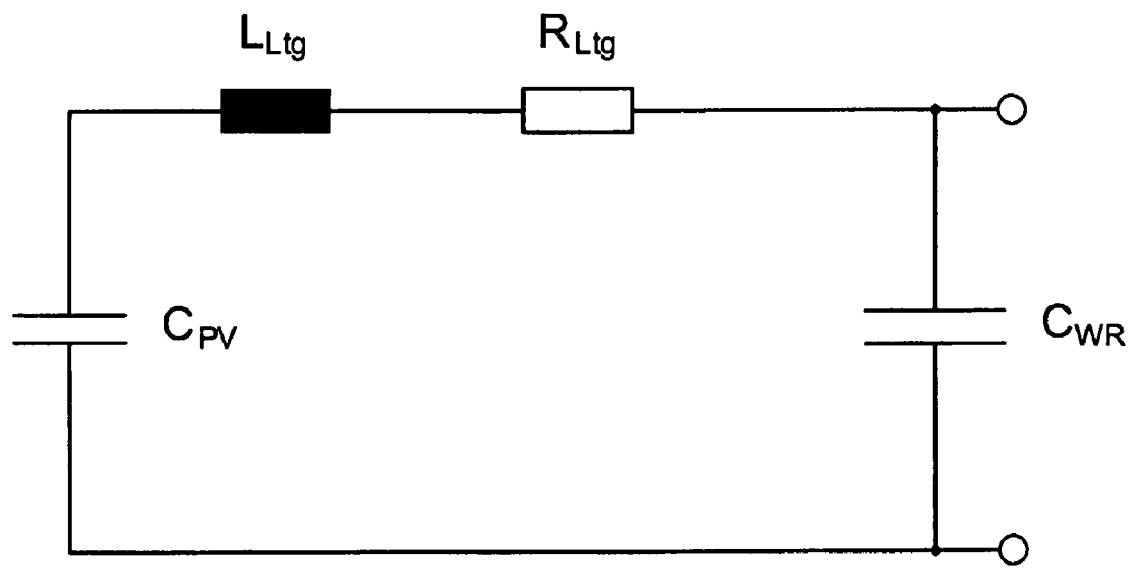
FIG. 3 shows an equivalent circuit diagram of a meander-shaped solar cell array.

As shown in FIG. 2, each solar cell has an equivalent circuit diagram with capacitances $C_{sp}$ and $C_{diff}$ with a diode and resistances. The various solar cells are disposed, more specifically in a meandering fashion, in a module that has not been illustrated in closer detail herein so that a quite long current line and, as a result thereof, a significant inductance is achieved as can be seen in the equivalent circuit diagram shown in FIG. 3.

If one module among a plurality of series connected modules and/or of parallel connected solar modules is removed, for example in the event of a theft, capacitances or inductances change. Since in principle a very complex circuit network composed of capacitors, inductances and resistances is provided, an electric variable will not compulsorily change significantly at one single frequency. If an alternating current is impressed, the output current of a measuring circuit will hardly change at one frequency whereas at another frequency the signal will change significantly. This is due to a change in the resonance property of the photovoltaic plant.

This is precisely where the method of monitoring a photovoltaic generator 1 for generating current with a number of solar cells connected between two external connections comes in.

In accordance with the invention, a current with a frequency spectrum is repeatedly introduced into the generator current circuit, a frequency response is registered in the frequency spectrum and a change in the frequency response or of an electric variable in the frequency response is registered for monitoring the photovoltaic generator 1.

Preferably, the current with a frequency is fed sinuisoidally using a first converter with primary and secondary winding, said converter being connected to the direct current circuit of the generator. Further, the frequency spectrum is detected using a second converter with primary and secondary winding, said second converter being mounted in series with the first converter.

In principle, several alternating current signals with different frequencies are utilized.

Figure 4:
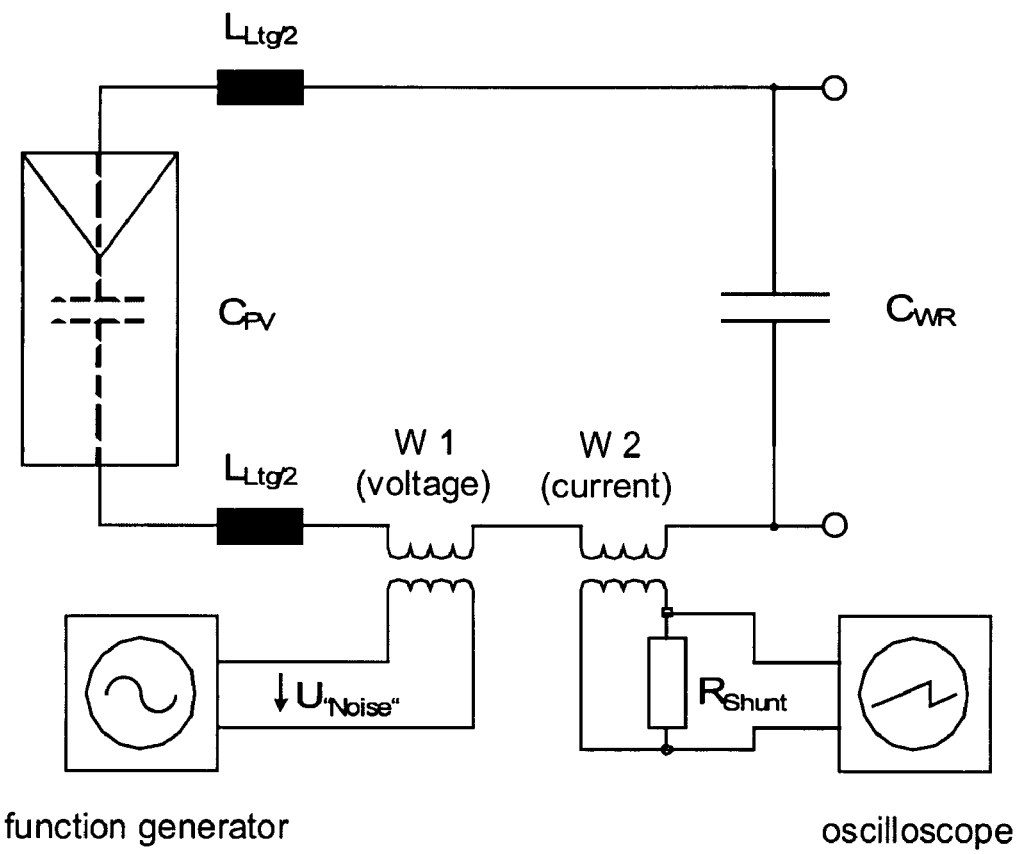
FIG. 4 shows a circuit arrangement for measuring a frequency response.

The measuring circuit shown in FIG. 4 clearly shows the principle. Two converters W1 and W2 are mounted in series with the generator 1. Each converter has a primary and a secondary winding, one winding of each converter lying in the direct current or DC circuit. The first converter W1 serves for feeding the frequency spectrum. A function generator 6 is used for this purpose, this function generator varying its frequency for example from 100 Hz (f1) to 500 Hz (f2). This means that the impressed current starts at 100 Hz, increases and ends at 500 Hz. This process is repeated in cycles.

Figure 5:
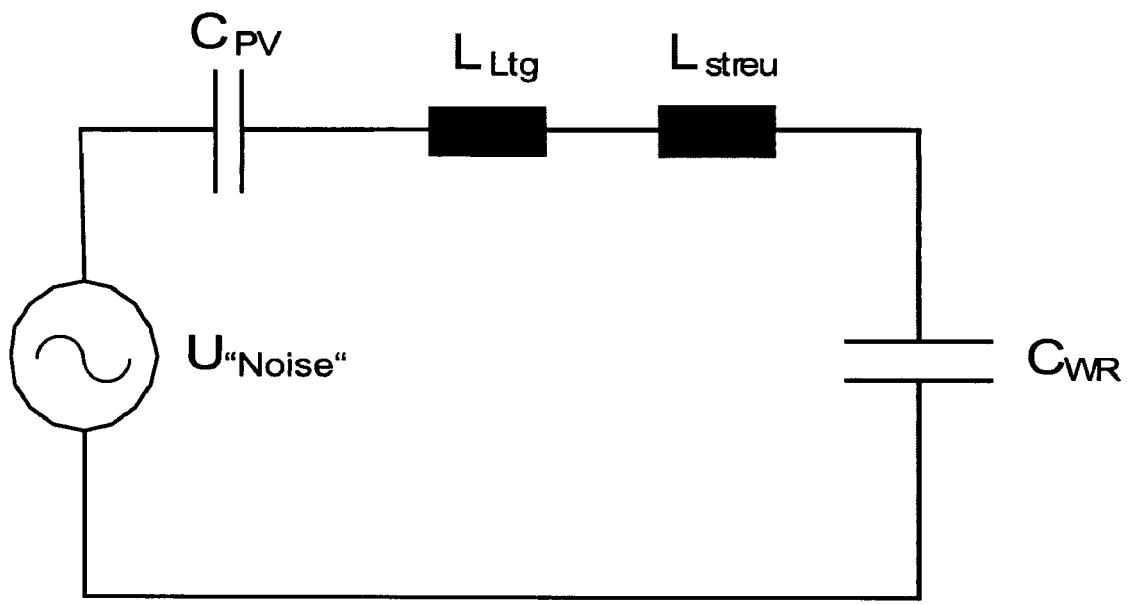
FIG. 5 shows an equivalent circuit diagram of the arrangement shown in FIG. 4.

A measuring apparatus 7, for example an oscilloscope or a frequency response analyzer, which records the frequency response, i.e., the alternating current as a function of the frequency, is connected to the second converter W2. On an oscilloscope, a voltage proportional to the frequency may be applied to the X input and the measuring voltage may be applied to the Y input. FIG. 5 shows the equivalent circuit diagram with the capacitance of the generator $C_{pv}$, the input capacitance $C_{WR}$ of the inverter and the line inductances. The latter form an oscillator circuit so that there is a significant signal change at a certain frequency or rather at the resonance frequency. An amplitude increases suddenly if it comes in proximity to the resonance frequency. The amplitude is limited by the attenuation or by the ohmic resistance of the equivalent circuit diagram or by the internal resistance. Since it is very small, the results achieved are very explicit.

It is preferred to form an auxiliary variable from measured current or voltage curves and to monitor the change of the auxiliary variable, an alarm signal occurring above a threshold value for the change of the auxiliary variable. The auxiliary variable is formed from the sum of the current or voltage amplitudes measured.

Figure 6:
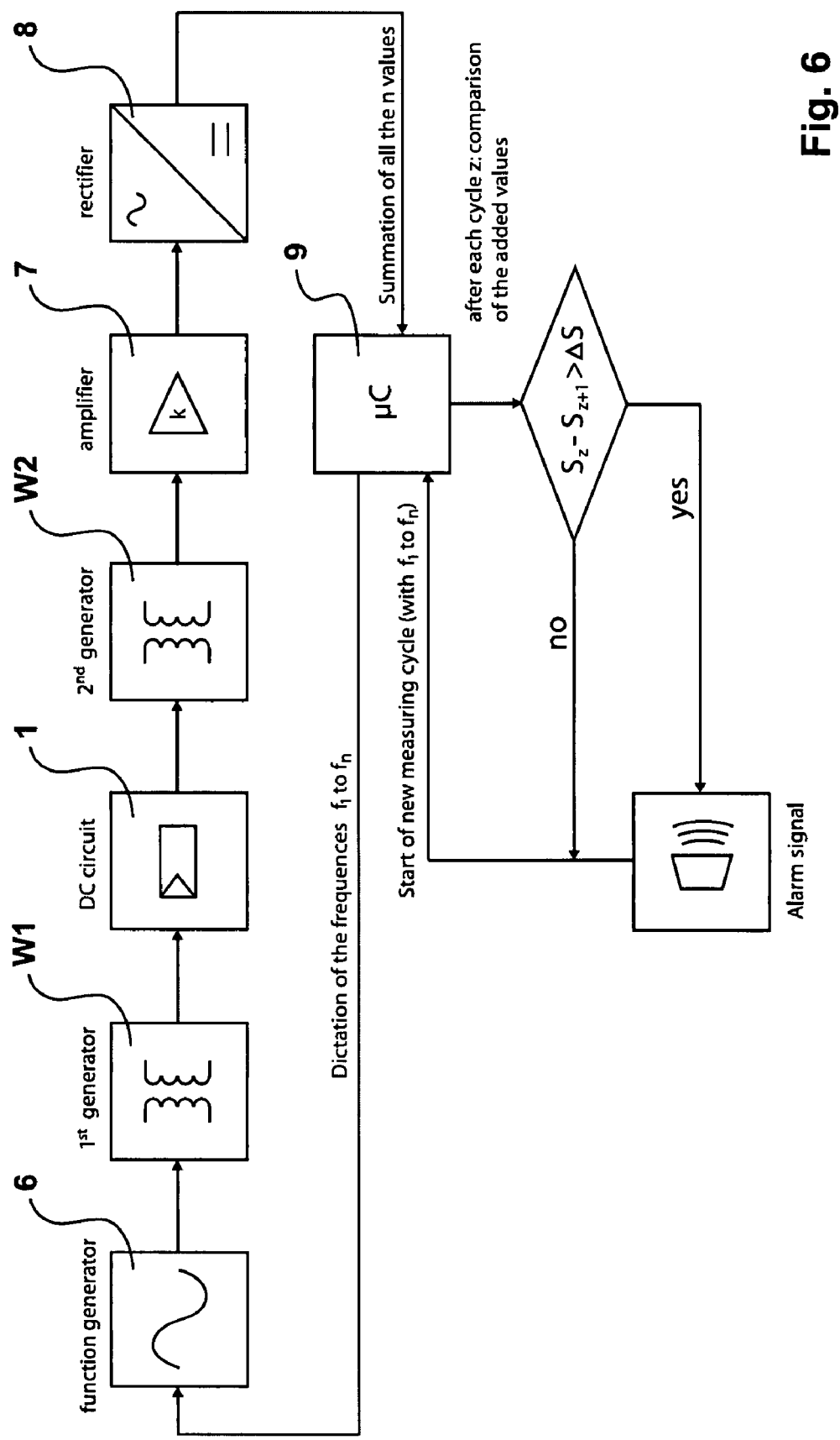
FIG. 6 shows a functional diagram of a preferred embodiment of the circuit arrangement for carrying out the method of the invention.

A function diagram of a preferred circuit arrangement for carrying out this preferred implementation of the method of the invention is shown in FIG. 6. The function generator 6 feeds the first converter W1 which, like the second converter W2, lies in the DC circuit of the generator 1. The output signal of the second converter is amplified by an amplifier 7 and is rectified by means of a rectifier 8.

The output signal of the rectifier is supplied to a microprocessor 9 that forms a sum signal $S_z$ after a frequency response. The microprocessor 9 further dictates to the function generator the frequencies $f_1$ to $f_n$ and locates frequency response differences.

If there is a sum signal difference S and if this difference exceeds a threshold value, an alarm signal is given as shown in FIG. 6.

Alternatively, the auxiliary variable may be formed from an integration of the surfaces below the measured curves.

A change of an electric variable that can be measured by the frequency spectrum may be the current as explained in the examples, but it may also be an impedance of the generator.

Figure 7:
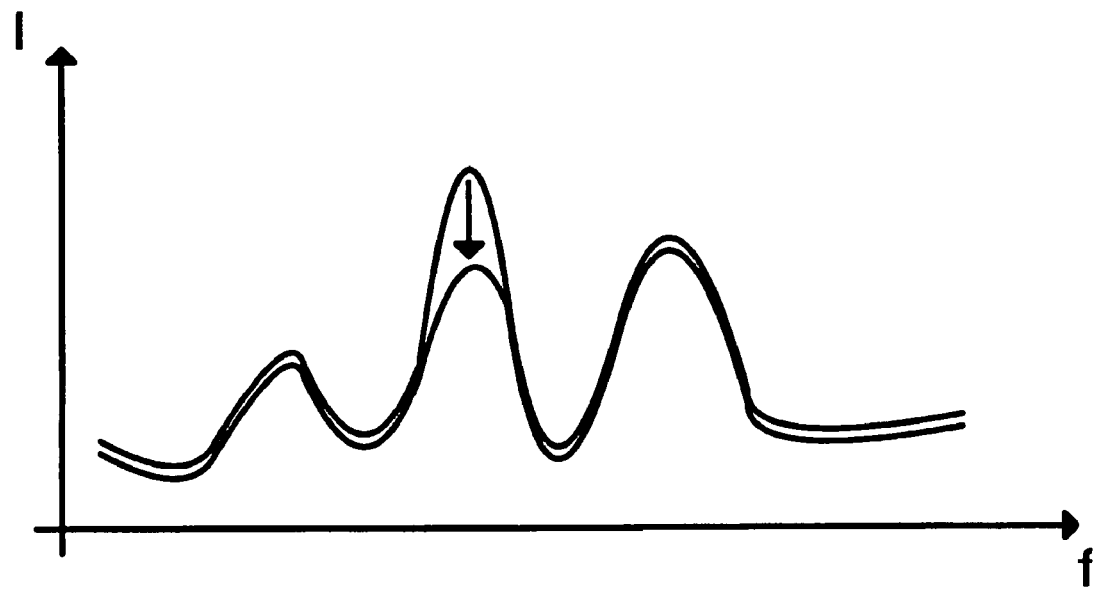
FIG. 7 shows a first illustration of a frequency response with and without partial generator.
Figure 8:
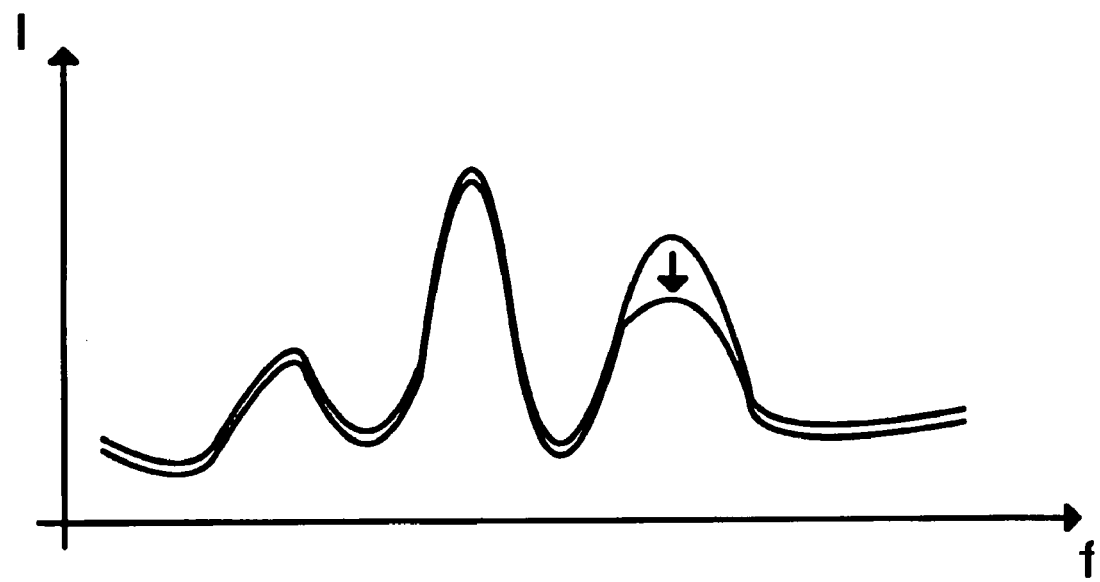
FIG. 8 shows a second illustration of a frequency response.

The FIGS. 7 and 8 illustrate possible signal changes. These variations show current amplitudes as a function of the frequency f.

As shown in FIG. 7, the frequency response changes when one partial generator or a module has been removed. The photovoltaic plant hereby comprises for example three resonance frequencies. A change may occur for example when one module is removed by a thief. Hereby, as can be seen, the amplitude only changes significantly in the range of a certain frequency or second resonance frequency (see arrow).

Another typical behaviour is shown in FIG. 8. Here, the amplitude also changes significantly, but now at another frequency, at the third resonance frequency (see arrow).

The invention is not limited to this example; the monitoring method may also be used to detect electric arcs. An electric arc may for example occur when the current path is interrupted or in the event of a short circuit. In principle, other damages to the generator may also be monitored. It is for example possible to locate damage to a partial generator due to hailstorm or the like without having to install an expensive monitoring camera. Other kinds of manipulations such as destruction through vandalism may be detected.

LIST OF NUMERALS 1 photovoltaic generator
2 photovoltaic modules
3 inverter
4 input capacitor
5 monitoring circuit
6 function generator
7 measuring apparatus
8 rectifier
9 microprocessor
W1 first converter
W2 second converter

We claim:

1. A method of monitoring a photovoltaic generator for generating current with a number of solar cells connected to an inverter via two external connections the method comprising:
   repeated feeding of a current with a frequency spectrum into the generator;
   detecting a respective response to the supplied current in the frequency spectrum as an output variable and
   detecting a change in the response for monitoring the photovoltaic generator in the event of a change during repeated feeding
   wherein the current having a frequency spectrum is fed using a first converter with primary and secondary windings that are connected to a direct current circuit of the generator and that the frequency spectrum is detected using a second converter with primary and secondary windings that are mounted in series with said first converter.

2. The method as set forth in claim 1,
   wherein the method is performed for detecting a theft or a manipulation.

3. The method as set forth in claim 2, wherein a second method is utilized during daytime, the second method using a reference sensor and monitoring for a current interruption from the photovoltaic generator.

4. The method as set forth in claim 3, wherein the reference sensor is configured to be a reference solar generator.

5. The method as set forth in claim 4, characterized in that a current or voltage amplitude response of the generator is registered when the frequency response is registered as the output variable, an auxiliary variable is formed from measured current or voltage curves and a change of the auxiliary variable is monitored, and an alarm signal occurring above a threshold value of a change of the auxiliary variable.

6. The method as set forth in claim 5, wherein the auxiliary variable is formed from the sum of the current or voltage amplitudes measured.

7. The method as set forth in claim 5, wherein the auxiliary variable occurs from an integration of the surfaces beneath the measured curves.

8. The method as set forth in claim 1, wherein a current with sinusoidal frequencies is fed in a direct current circuit of the generator.

9. The method as set forth in claim 1, wherein the output variable, a change of which is measured in the frequency spectrum, is a current or an impedance of the generator.

10. The method as set forth in claim 9, being used on a generator having several solar modules connected in parallel and/or in series.

11. A method as set forth in claim 1, wherein the method is performed for detecting electric arcs due to contact separation or defective contacts of the photovoltaic generator.

12. A method of monitoring a photovoltaic generator for generating current with a number of solar cells connected between two external connections, characterized by repeated feeding of a current with a frequency spectrum into a generator current circuit, detecting thereby a respective frequency response in the frequency spectrum with the supplied current as an input variable and an electric variable of the generator as an output variable, and detecting a change in the frequency response for monitoring the photovoltaic generator in the event of a change during repeated feeding, a current or voltage amplitude response of the generator is registered when the frequency response is registered as an output variable, an auxiliary variable is formed from measured current or voltage curves and a change of the auxiliary variable is monitored, an alarm signal occurring above a threshold value of a change of the auxiliary variable, and the auxiliary variable is formed from a sum of the current or voltage amplitudes measured.

13. A method of monitoring a photovoltaic generator for generating current with a number of solar cells connected between two external connections, characterized by repeated feeding of a current with a frequency spectrum into a generator current circuit, detecting thereby a respective frequency response in the frequency spectrum with the supplied current as the input variable and an electric variable of the generator as the output variable, and detecting a change in the frequency response for monitoring the photovoltaic generator in the event of a change during repeated feeding, a current having a frequency spectrum being fed using a first converter with primary and secondary winding that is connected to a direct current circuit of the generator and wherein the frequency spectrum is detected using a second converter with primary and secondary winding that is mounted in series with said first converter.

14. The method as set forth in claim 13, characterized in that a current with sinusoidal frequencies is fed in a direct current circuit of the generator.

15. The method as set forth in claim 13, characterized in that the electric variable a change of which is measured in the frequency spectrum is a current or an impedance of the generator.

* * * * *

UNITED STATES PATENT AND TRADEMARK OFFICE
CERTIFICATE OF CORRECTION

| | | |
|---|---|---|
| PATENT NO. | : 7,812,592 B2 | Page 1 of 1 |
| APPLICATION NO. | : 11/978334 | |
| DATED | : October 12, 2010 | |
| INVENTOR(S) | : Oliver Prior et al. | |

It is certified that error appears in the above-identified patent and that said Letters Patent is hereby corrected as shown below:

Column 4, Line 57: after "difference" and before "S" insert --$\Delta$--.

Signed and Sealed this
Eleventh Day of October, 2011

David J. Kappos
*Director of the United States Patent and Trademark Office*